Dec. 22, 1936.        F. RIEBEL, JR., ET AL         2,064,853
VACUUM CLEANER
Filed Aug. 2, 1935
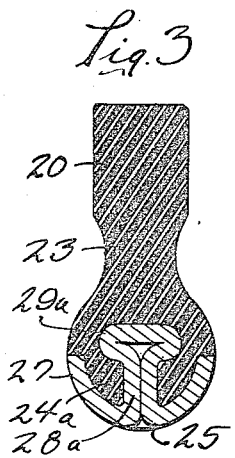
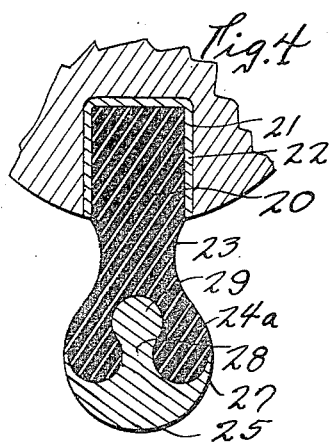
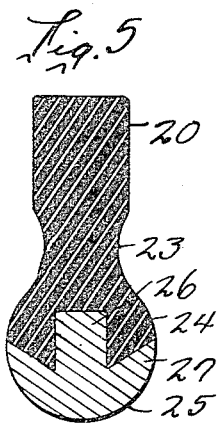
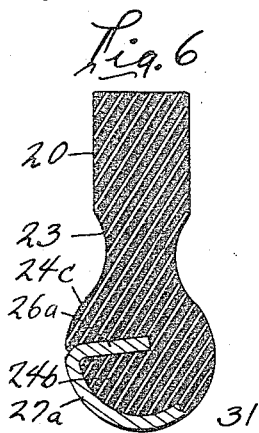
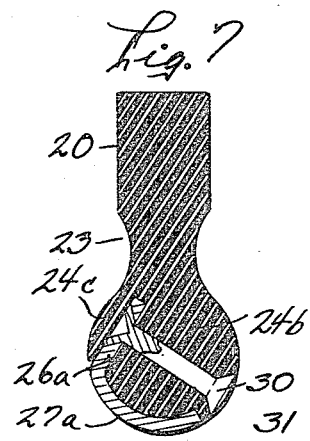
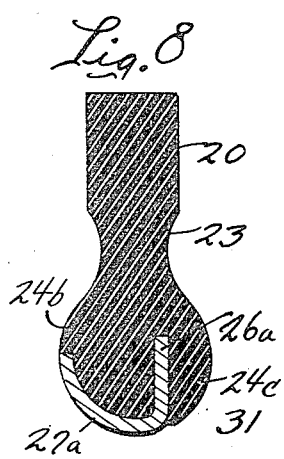
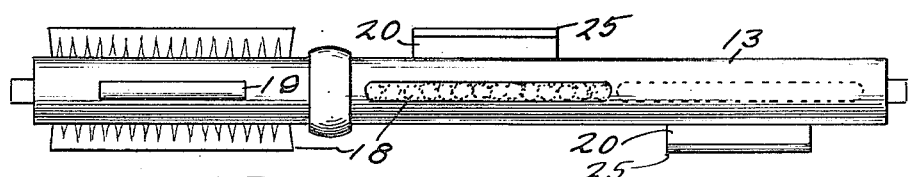
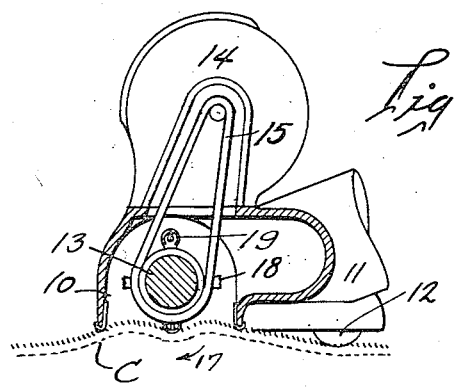

Patented Dec. 22, 1936

2,064,853

UNITED STATES PATENT OFFICE 2,064,853

VACUUM CLEANER

Frederick Riebel, Jr., and Dewey M. Dow, Toledo, Ohio, assignors to Air-Way Electric Appliance Corporation, Toledo, Ohio, a corporation of Delaware Application August 2, 1935, Serial No. 34,397

11 Claims. (Cl. 15—13)

This invention relates to vacuum cleaners of the type which agitates an air cushion suspended carpet by means of a high speed motor driven rotary agitator including flexibly mounted beaters, such as that covered in pending application Serial No. 752,270, filed November 9, 1934, of which the present application constitutes a continuation in part.

The object of this invention is to provide a rotary agitator including a spindle and a beater attached thereto by resilient means allowing relatively free circumferential deflection of the beater yet mounted for movement in a path which varies only slightly in its radial distance from the axis of revolution no matter what the speed of rotation.

The invention is embodied in a rotary agitator comprising a spindle and a beater element of soft rubber or equivalent material secured thereto and projecting radially therefrom.

It has been proposed, heretofore, to employ bare rubber strips for this purpose. But we have discovered that such beaters will exert so much friction against the carpet pile, that rotation of the agitator is seriously retarded, and there is an undue amount of injury to the carpet from pulling out the pile fibers. Thus the benefits which have been sought in the use of flexible beaters, are lost.

The present invention achieves the long sought combination of dirt loosening effectiveness and minimum rug injury, by employment of soft rubber beater strips having carpet contacting tips of hard, tough material capable of maintaining a smooth polish on their contacting surfaces under operation against a carpet.

The invention further deals with a specific arrangement for securing the contacting tip to the rubber strip, wherein the tip has a tongue secured between two furcations formed in the rubber strip, and a contacting region extending circumferentially from said tongue.

In one form taken by the invention, an additional object is to keep the weight of the tip at a minimum in order to minimize its tendency to pull away from the rubber under the effect of centrifugal force. This is accomplished by employing a tip in the form of a relatively narrow face plate, centered at one side of the bisecting plane of the beater, so as to just cover sufficient area to take all of the carpet contact.

In earlier forms of our invention, we employed simply a channel embracing a cylindrical head formed in the rubber strip. The present invention provides the embedded tongue as a means for resisting the tendency of the said channel to slip circumferentially on the head under the side-swiping impact of carpet contact. This is especially important in a case where the beater strikes an object, such as a pencil or hairpin, in a position such that the edge of the beater is caught against the object, in which case there is a tendency to strip the channel from the rubber.

With these and other objects in view the invention consists in the combination and construction and arrangement of the various parts thereof, whereby the objects contemplated are attained, as more fully set forth in the accompanying specifications, pointed out in the claims, and illustrated in the accompanying drawing, in which:

Fig. 1 is a cross sectional view through one end of a floor tool of a vacuum cleaner embodying the invention.

Fig. 2 is a plan view of the rotary agitator.

Fig. 3 is a transverse sectional view through a beater embodying one form of the invention.

Fig. 4 is a transverse sectional view through a modified form of the beater, a portion of the spindle being shown.

Fig. 5 is a transverse sectional view through another modification of the beater.

Fig. 6 is a similar view of another modification.

Fig. 7 is a similar view of another modification.

Fig. 8 is a similar view of another modification.

The invention is embodied in a vacuum cleaner floor tool including a suction chamber 10 and a neck 11 connecting the same to a source of suction. Wheels 12 support the suction chamber 10 above the supporting surface, and the carpet C is lifted by suction against the mouth of chamber 10. An agitator drive motor 14, mounted on top of the suction chamber 10, drives the rotary agitator spindle 13 by means of a belt 15. The direction of rotation is indicated by arrow 17.

Socketed in the spindle 13 are brush elements 18 and beaters 19.

The beater 19 comprises a strip of rubber 20 secured to the spindle 13 parallel to the axis thereof and extending radially therefrom. Preferably the mode of securing comprises socketing in a socket 21, (Fig. 4) and a metal backing channel 22 may be secured to the rubber strip 20 for engagement in the socket 21.

The strip 20 has a neck 23 forming the flexing portion of the agitator, and terminating in a pair of longitudinally extending furcations 24. (Fig. 5.)

The carpet contacting tip 25 (Fig. 5) has a tongue 26 which is cemented between the furcations 24, and a pair of wings 27 which extend beneath the edges of and embrace the furcations 24 and are cemented thereto.

The tip 25 is of a hard, tough wear resisting material having a smooth polished contacting surface and capable of maintaining a polish under constant use against the pile of a carpet. Suitable materials include metal, hard fiber, leather, rawhide, hard rubber or hard wood.

To obtain greater retention of the tip in the rubber, the tongue 26 is preferably provided with a narrowed neck 28 terminating in an enlarged head 29 (Fig. 4), and the furcations 24a converge toward each other toward their outer edges so as to engage the narrowed neck 28.

Additional retention is secured by employing the wings 27 to embrace and hold the furcations 26 against spreading.

In the form shown in Fig. 3, the tip is made of sheet metal and the tongue 26 is formed as a fold in the intermediate region thereof, a narrowed neck 28a being formed by having the intermediate portions of the fold in contact with each other and a T-shaped head 29a being formed by spreading and offsetting the metal of the fold at the bend thereof. The wings 27 are preformed in a more open position relative to the tongue 26 than that shown in Fig. 3, so as to allow easy insertion of the furcations 24a between the wings 27 and head 29a. The wings 27 are thence closed upon the furcations 24a after cement has been applied, and a very secure retention is thus obtained.

In the form shown in Fig. 6, the tongue 26a is formed at one side extremity of the circumferential carpet engaging plate or wing 27a, and the latter is made just wide enough to take all of the carpet contact under all operating conditions and is centered to one side of the bisecting longitudinal plane of the agitator at the center of carpet contact. The wing 26a is secured between the furcations 24b and 24c formed by slotting the strip 20 transversely to its bisecting plane. It will be noted that the tip in this case is in the form of a channel one leg of which is embedded in the strip, the channel being so positioned that the impact of carpet contact only tends more to drive it into the rubber than to pull it away from the rubber, and the pull of centrifugal force is opposed by the transversely positioned tongue 26a and the transversely extending furcation 24c which is hooked thereunder.

The same is true in a lesser degree of the form shown in Fig. 7 wherein the tongue 26a extends at an angle relative to the bisecting plane of the strip. In this case a rivet 30 is extended through the tongue 26a and through the bifurcation 24b which is the thicker of the two bifurcations. In this form of the invention, the bifurcation 24c may if desired be entirely omitted, the tongue 26a being simply riveted to the forward face of the rubber strip.

In the form shown in Fig. 8, the tongue 26a is formed at the rear extremity of the carpet contacting plate 27a instead of at the forward extremity thereof as in Figs. 6 and 7 and the position of the furcations 24b and 24c is correspondingly reversed.

In the operation of the device, the beater as it revolves in the direction indicated by the arrow 17, contacts the carpet C suspended by suction against the mouth of the nozzle 10. The resistance of the carpet causes the beater to flex circumferentially of the spindle 13 the locus of flexing being in the neck 23, and there will also be a certain amount of radial depression, combining with the flexing to cushion the blow against the carpet. The radial depression, however, is kept at a minimum owing to the thickness of the neck 23, which is made sufficient so that the beater also will be held strictly within a low limit of radial distension under centrifugal force when not in carpet contact so that the position of the agitator as it strikes the carpet will be properly adjusted to the mouth of the floor tool irrespective of the speed of rotation. This adjustment of the beater path of revolution to the mouth of the floor tool may be varied to meet varying conditions found in varying types of carpets, by manual means (not shown) affecting the height of the floor tool relative to the roller 12.

The rubber used is preferably of a resiliency between 30 and 50 durometer hardness, a very satisfactory rubber being 40 durometer.

Owing to the circumferential deflection, the side-swiping effect of the beater is reduced to a minimum, while the beater still possesses sufficient vertical punching capacity to meet the standard of requirement for knocking dirt out of a rug.

We claim:

1. In a vacuum cleaner, a motor driven rotary agitator, comprising a rotating spindle and a beater secured to the spindle and projecting radially therefrom, said beater comprising a strip of readily flexing material formed with longitudinally extending furcations, and a carpet contacting tip of wear resisting material having and capable of maintaining under operating conditions, a smooth, polished contacting surface, said tip having a tongue adhesively secured between said furcations.

2. The combination set forth in claim 1, including wings extending circumferentially from the outer extremity of said tongue, said wings serving both to provide contacting surface and to embrace and restrain said furcations in adhesive contact with the tongue.

3. The combination set forth in claim 1, wherein the tongue has a narrow neck and a widened head, and wherein the furcations engage said narrow neck.

4. The combination set forth in claim 1, wherein the tip is formed of sheet metal, and the tongue comprises a central fold therein, with the walls of the fold lying together to form a narrow neck and spread apart at the bend forming the inner end of the tongue, to form a T-shaped head.

5. The combination set forth in claim 1, wherein the tip includes a circumferentially extending portion centered on the leading side of the bisecting plane of said beater.

6. The combination set forth in claim 1, wherein the tongue is formed at one side extremity of a circumferential portion forming the contacting region of the tip.

7. The combination set forth in claim 1, wherein one furcation is of greater thickness than the other, the tongue is formed at one side extremity of a circumferential portion forming the contacting region of the tip and wherein a rivet extends through the tongue and through the thicker furcation.

8. In a vacuum cleaner, a motor driven rotary agitator comprising a spindle and a beater secured thereto and projecting radially therefrom, said beater comprising a strip of readily flexing resilient material and a contact tip secured thereto, the latter comprising a tongue riveted to a leading side region of the strip and a circumferential plate bent laterally from the outer extremity of said tongue and overlying the outer edge of the strip.

9. In a vacuum cleaner, a motor driven rotary agitator comprising a spindle and a beater secured thereto and projecting radially therefrom, said beater comprising a strip of readily flexing resilient material and a contact tip secured thereto, the latter comprising a tongue riveted to a side region of the strip and a circumferential plate bent laterally from the outer extremity of said tongue and overlying the outer edge of the strip.

10. In a vacuum cleaner, a motor driven rotary agitator comprising a spindle and a beater secured thereto and projecting radially therefrom, said beater comprising a strip of readily flexing resilient material and a contact tip secured thereto, the latter comprising a tongue portion forming the means for attaching the tip to the strip, and a carpet contacting portion overlying the outer edge of the strip.

11. In a vacuum cleaner, a motor driven rotary agitator comprising a spindle and a beater secured thereto and projecting radially therefrom, said beater comprising a strip of readily flexing resilient material and a metal contact tip secured thereto, the latter comprising a tongue riveted to a side region of the strip and a circumferential plate bent laterally from the outer extremity of said tongue and overlying the outer edge of the strip.

FREDERICK RIEBEL, JR.
DEWEY M. DOW.